March 24, 1970  J. CHABOSEAU  3,502,920
ELECTRICAL MACHINE INCORPORATING GAS BEARINGS
Filed March 9, 1967  2 Sheets-Sheet 1
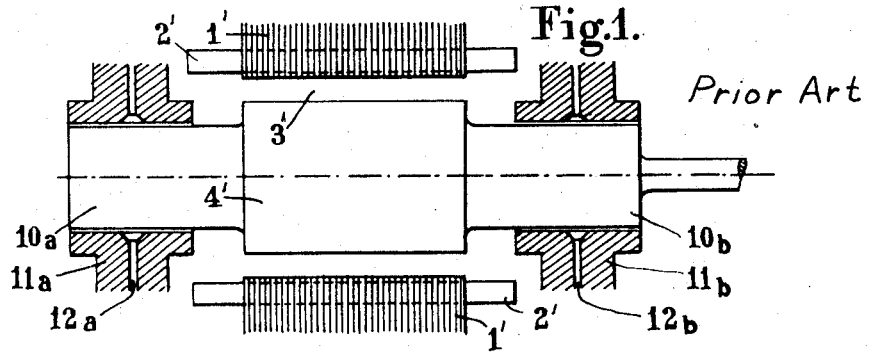
Fig.1. *Prior Art*
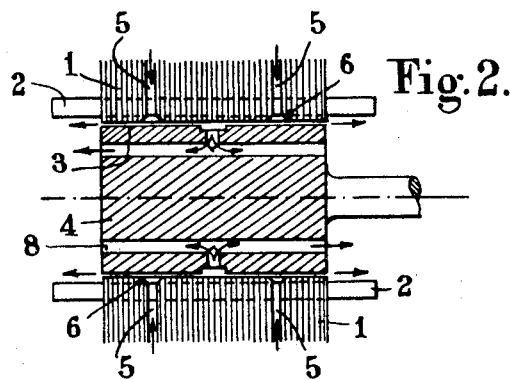
Fig.2.
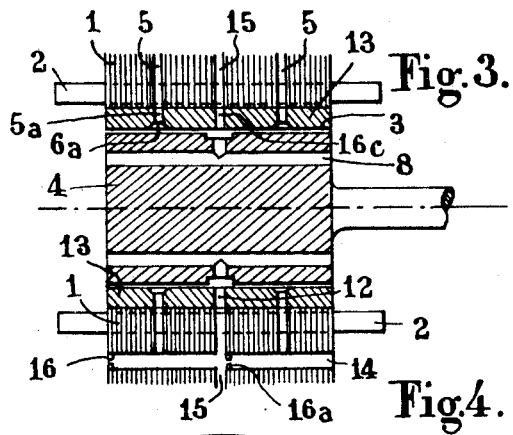
Fig.3.
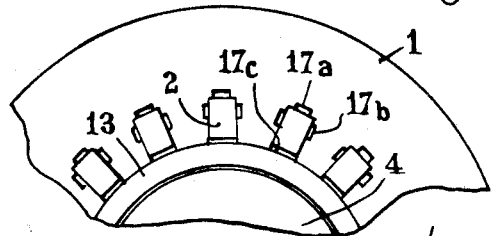
Fig.4.
Inventor
Jean Chaboseau
By Pierce, Scheffler & Parker
Attorneys

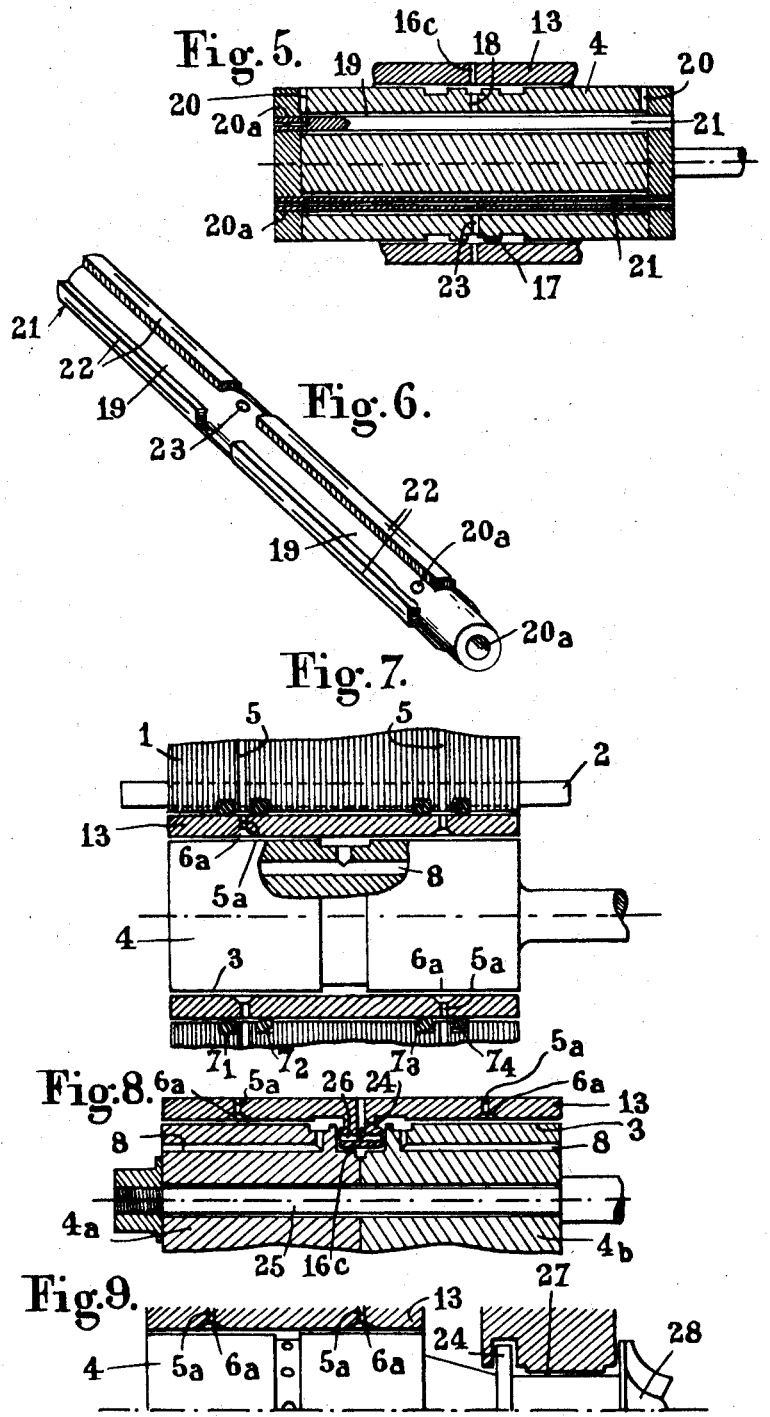

United States Patent Office 3,502,920
Patented Mar. 24, 1970

---

3,502,920
ELECTRICAL MACHINE INCORPORATING GAS BEARINGS
Jean Chaboseau, Boissy St. Leger, France, assignor to Compagnie Electro-Mecanique, Paris, France, a body corporate of France
Filed Mar. 9, 1967, Ser. No. 621,986
Int. Cl. H02k 5/16
U.S. Cl. 310—90
10 Claims

ABSTRACT OF THE DISCLOSURE

A dynamo-electric machine such as a motor or generator which comprises a stator member and a cylindrical rotor member arranged to rotate within a cylindrical bore provided within the stator member. The annular clearance gap between the periphery of the rotor and the surface of the stator is slight and is gas-pressurized throughout the length of the gap so as to establish a gas bearing sustaining the rotor for its rotation. A sleeve of uniform diameter and of non-magnetic material is used to line the bore in the stator to establish a more uniform cylindrical surface for the gas bearing. The pressurized gas used to supply the gas bearing extending throughout its length is also utilized to cool the rotor and stator as well as the rotor and stator conductors by means of cooling channels associated therewith and through which the pressurized gas is passed. A gas-pressurized thrust bearing is also incorporated in the structure at an intermediate point along the rotor for maintaining the rotor against undesired axial displacement.

---

It is known that the use of gas bearings for the purpose of supporting the rotor of revolving machines is facilitated when these machines operate under favorable conditions, that is:

when there is a gas medium under high pressure, which is particularly conducive to the use of bearings known as "aerostatic";

there is a very high rate of rotation, which is particularly favorable to the use of bearings known as "aerodynamic."

It is also known that the losses "through windage" of a rotor turning in a fluid, and particularly in a gas, increase rapidly-according to well-known laws—when the speed of rotation of the rotor and the gas pressure in which it revolves increase. It results from this phenomenon that when the rotor under consideration consists of a rotor for an electric motor, it is frequently found that the losses through ventilation represent a considerable part of the power demanded of the motor; these losses can be considered as being prohibitive, either by reason of the waste of energy which they represent or because of the technological problems which they pose for the designers, who must avoid overheating of the machine.

It is also known that, in a general way, the level of the aerodynamic losses—those said to be caused by "windage"—which are generated between two concentric cylinders in relative rotation in a gas is linked with the aerodynamic character of the gas flow between these cylinders, which can be "laminar" or "turbulent."

When the flow is of the type called "laminar," the level of the losses, at equal velocity and under equal pressure, is substantially lower than when the flow is of the type known as "turbulent."

In the ambient space on rotors of turbo-engines, as in the ambient space of electrical engines, the flow is of the turbulent type.

In the bearings of these machines, when these bearings are of the fluid type (oil or gas), the flow is, very generally, of the laminar type; this situation is obtained in gas bearings notably because they operate with a relatively very small clearance gap between the rotor, which is called a "pin," and the bushing which surrounds the pin, which is called a "pillow."

It is found that the power required to entrain the rotor member confined to the pin is low with respect to what it would be if the clearance between the pin and the pillow were itself 20 or 50 times greater; this relative order of magnitude being that of the clearance which would be had in an electric motor, if the armature were of the same diameter as the pin of the rotor under consideration.

The circumstances described above can be made use of so as to reduce very substantially the losses through windage, and, to this effect, the electric motor according to the present invention is characterized by the fact that the bore of the stator, and the rotor designed to turn in this bore are designed in such a way that it is possible to obtain a supporting effect from the gas film separating the rotor and the stator.

It is sufficient that the facing surfaces of the rotor (the rotating element, generally the armature) and the stator (the stationary member, generally the inductor) be built according to the same operating specifications as the combined members (pin and pillow) of a gas bearing, so as to obtain the result that the supporting force which makes it possible to avoid contact between the rotor and the stator is generated in the annular gap between the two.

Various embodiments of the invention are described below by way of example, with reference to the appended drawings, in which:

FIG. 1 is a view in longitudinal section of a conventional electric motor whose rotor is supported by gas bearings of the classic type;

FIG. 2 is a similar view of the motor designed according to the present invention.

FIG. 3 shows a variation of the embodiment according to FIG. 2.

FIG. 4 is a fragmentary view from the end of the motor of FIG. 3.

FIG. 5 is a partial view in longitudinal section of another variant.

FIG. 6 is a view in perspective of a rotor conductor, and

FIGS. 7 through 9 are views in longitudinal section of other versions.

The same reference numbers were used to designate similar members in the various figures.

The conventional electric motor with gas bearings shown in FIG. 1 contains a laminated cylindrical stator 1' supporting the stator conductors 2' equipped with terminals. Inside of the stator the armature 4' rotates and a relatively significant annular running clearance 3', called the air gap, spaces the armature from the stator. The armature is supported at its opposite ends by gas bearings operating in a known manner. The pins 10a and 10b of these bearings rotate with a very small clearance inside of the pillows 11a and 11b built into the stator structure. Gas under pressure is fed into the bearings, which are assumed to be aerostatic, by the pipes 12a and 12b.

The electronic motor with gas bearings made according to the invention, such as is shown in FIG. 2, likewise contains the stator 1 supporting the stator conductors 2. The armature 4, however, which is of uniform diameter rotates with a very small clearance 3 inside of the stator 1. The gas feeding the bearing now constituted by the small gap between stator and rotor is introduced through the stator by means of the radial channels 5, which perform the same function as the pipes 12 in FIG. 1, and open at orifices 6 into the small clearance gap 3. After being released into the gap, the supporting gas is evacuated to the outside, on the one hand, through the ends of the stator into which the clearance 3 opens and, on the other hand, by means of internal axially extending channels 8 of the rotor. This embodiment has the following advantages:

a reduction in the losses through windage, by modifying the aerodynamic character of the gas flow in the clearance gap 3;
better use of gas bearing structure because of the simplifications made in the concept and manner of embodiment related to the elimination of the necessary disparity between the diameters of the armature 4 and the end bearing pins 10 of FIG. 1;
a lower rotation load because of the elimination of the pins 10.

The difficulties mentioned below, however, could perhaps in some instances be prohibitive:

the difficulty of making a uniform stator bore, particularly on large motors;
the difficulty of maintaining the clearance of the bearing gap, particularly for electric motors, or other electrical machines the performance of which is very close to limits not to be exceeded so that their life will still be acceptable, because of the difference in heating between the rotor and stator and because of various instability phenomena.

The difficulties can be overcome by the following means:

The uniformity of the bore can be ensured by using a thin bushing made of a non-magnetic material introduced between the rotor and the stator in place of the gap shown by 3 in FIG. 2. This ensures, moreover, a sufficient magnetic gap, despite the small mechanical clearance between the stator and the rotor. Thus, the motor shown in FIG. 3 has a pillow bushing 13 built into the stator 1, pierced with radial channels 5a, prolonging the radial channels 5 of the stator and opening into the orifices 6a.

The gas under pressure which is eventually needed to feed the aerostatic bearings is used to ensure the necessary cooling required for regulating the temperatures of the stator and rotor. For this purpose, as shown in FIG. 3, the cooling of the stator is ensured by the longitudinally extending internal channels 14, which are substantially parallel to its axis, fed with cooling gas through the inlets 15, which can also ensure the cooling of the rotor via longitudinal channels 8 therein which communicate with clearance 3. The distribution of the input of cooling gas can be regulated by adjusting the orifices in end diaphragms 16 at the end of channel 14. Diaphragms 16a can also be disposed in channel 14 close to the intake 15, especially if this is done in the form of an empty space contained between two plates of the stator, the diaphragm then being made advantageously in the form of a smaller passageway through each plate contiguous to the space 15.

The cooling of the rotor can be ensured by the circulation of the gases feeding the bearings on its perimeter at 3, and also by the surface of the discharge channels 8. A supplementary gas flow through channels 14 can be ensured beyond the intake 15 by virtue of the appropriate diaphragms 16a.

Direct cooling of the conductors can also be installed. The stator conductors 2 can be cooled by the gas coming from the intake 15 (or the intakes 5 of FIG. 2) if proper spacing is allowed for the longitudinal circulation of the gas at the bottom of the slots in the stator receiving the conductors 2; thus FIG. 4 shows the spaces 17a, 17b, and 17c obtained by cutting with the slots to allow the gas to circulate along the conductors 2.

The rotor conductors can be cooled, as shown by FIGS. 5 and 6, by the gas fed in under pressure by the diaphragms 16c in front of a circular chamber 17 on the perimeter of the rotor 4, feeding, through the radial channels 18, a rotor conductor clearance 19, and ejected by radial bores 20 at the end of the rotor, or by the axial bores 20a at the end of the conductors, if the clearance 19 cannot be made to extend to the extremity of the conductor bars 21. As shown by FIG. 6, the clearance 19 can be formed by longitudinal grooves, between the ridges 22 which ensure that the conductor bar 21 is held in the rotor. If the conductor bar is hollow, the interior 20a' can be fed through the orifices 23 situated in the region of the bar, free of the ridges 22, located in front of the channels 18 shown in FIG. 5.

The operation of the motor can be substantially improved by having the non-magnetic bushing separate from the stator:

the thermal separation makes it possible to bring the temperatures of the bushing and the rotor more easily into alignment, because of the small mass of the bushing and the high gas convection in the clearance between the bushing and the rotor;
the mechanical separation permits free radial dilation of the bushing and an improved operation of the bearing, if the elasticity and dampening effect of the connection between the bushing and the stator have been properly selected.

Thus, in the form of embodiment shown in FIG. 7, the pillow bushing 13 is separate from the stator 1 and is elastically suspended to the latter by use of means $7_1$–$7_2$, $7_3$–$7_4$ in the form of the "O-rings," which can be made of an elastomer or a thin metallic tube. Other equivalent separation means can be employed. The use of O-rings makes it possible to obtain in a simple manner sealed chambers between the stator 1 and the pillow bushing 13. An axial positioning member is usually required to ensure the axial position of the rotor of motor-driven units. This role has been assigned to a thrust block, which is ordinarily placed outside of the motor, being either contiguous to it or adjacent to the driven apparatus.

An electric motor with a built-in supporting gas bearing can also be adapted to include a thrust block ensuring the maintenance of the axial position of the rotor as shown in FIG. 8, which shows a motor with a massive iron rotor without conductors, to simplify the diagram. The pillow bushing 13 is equipped in its center with a collar 24, which is designed to be seated in a groove homologous with the rotor, made for this purpose of two members 4a and 4b held one against the other by the tie rod 25. The collar 24 and its groove homologous with the rotor constitute the gas thrust bearing fed by the channels 16c and 26 operating in a known manner, with the feed gases being discharged through the channels 8 serving, moreover, to cool the rotor. The support bearings are situated on each side of the thrust block and fed by the bores 5a and orifices 6a opening into gap 3.

If the rotor is to support conductors, it can be built as a double rotor, with each one of the members 4a and 4b being assembled mechanically by means of the tie rod 25 and forming an electrically complete rotor member.

The rotor of the electric motor can also consist of a shaft member supported, moreover, outside of the motor by other bearings without going beyond the scope of the invention; thus, FIG. 9 shows the rotor 4 of the electric motor with gas bearings integrated with the pillow bushing 13, a thrust block 24, another support bearing 27, and the driven member, in this case a pump 28.

To simplify the description, the electrical machine concerned has been called a motor; it is obvious that the manner in which the invention operates has no connection with the machine in question, which could just as well be a generator without going outside the framework of the invention. Thus, in the appended claims, the generic term "dynamo-electric machine" has been used to designate both motor and generator applications of the invention.

It is, of course, understood that the various forms of embodying the invention which have been described above with reference to the appended drawing have been given only by way of examples that are purely indicative and in no way limitative, and that numerous modifications can be made without thereby going beyond the scope of the present invention.

I claim:

1. A dynamo-electric machine having a stator member of magnetic material provided with a substantially cylindrical bore extending from one end thereof to the other, a uniformly diametered bushing of non-magnetic material lining said bore in said stator member, a cylindrical rotor member substantially co-extensive in length with said stator member, said rotor member being located within said bushing and having a diameter slightly less than the internal surface of said bushing thereby to establish a slight annular clearance gap therebetween, and means including at least one passageway through the body of said stator member and said bushing opening into said clearance gap for supplying a flow of pressurized gas into said clearance gap thereby to establish a gas bearing sustaining said rotor member for rotation within said bushing.

2. A dynamo-electric machine as defined in claim 1 wherein said bushing is provided with an intermediately located thrust collar extending radially inward into a companion circular groove in said rotor member, said thrust collar being provided with oppositely directed axial passageways conducting said pressurized gas in opposite directions against the opposite walls of said groove thereby to maintain said rotor member against any axial displacement within the bore of said bushing.

3. A dynamo-electric machine as defined in claim 2 wherein said rotor member is composed of two cylindrical sections joined together and the junction line between the abutting inner ends of said cylindrical sections is located at essentially the center of said circular groove.

4. A dynamo-electric machine as defined in claim 1 and which further includes elastic means spacing the external surface of said bushing from the wall of said stator bore.

5. A dynamo-electric machine as defined in claim 4 and wherein said elastic spacer means between said bushing and stator bore is constituted by O-rings.

6. A dynamo-electric machine having a stator member provided with a substantially cylindrical bore extending from one end thereof to the other, means providing internal channels extending longitudinally within said stator member, a cylindrical rotor member substantially co-extensive in length with said stator member, said rotor member being located within said cylindrical bore in said stator member and having a diameter slightly less than that of said bore in said stator member thereby to establish a slight annular clearance gap therebetween, said rotor member including internal channels extending longitudinally thereof and intermediately located generally transverse channels placing said internal rotor channels in communication with said clearance gap between said stator and rotor members, means including at least one passageway through the body of said stator member communicating with said internal channels within said stator member and opening into said clearance gap for supplying a flow of pressurized gas through said internal channels for cooling said stator member and also into said clearance gap thereby to establish a gas bearing sustaining said rotor member for rotation within said stator member, said pressurized gas flowing from said clearance gap into and through said longitudinal channels in said rotor member for cooling said rotor member, and gas flow restrictor means for adjusting the ratio of the cooling gas flowing through said internal channels in said rotor and stator members.

7. A dynamo-electric machine having a stator member provided with a substantially cylindrical bore extending from one end thereof to the other, said stator member including slots containing the stator conductors, a cylindrical rotor member substantially co-extensive in length with said stator member, said rotor member being located within said cylindrical bore in said stator member and having a diameter slightly less than that of said bore in said stator member thereby to establish a slight annular clearance gap therebetween, means including at least one passageway through the body of said stator member and opening into said clearance gap for supplying a flow of pressurized gas into said clearance gap thereby to establish a gas bearing sustaining said rotor member for rotation within said stator member, and means for directing a portion of said pressurized gas from said gas supply passageway in said stator member through said stator slots for cooling said stator conductors.

8. A dynamo-electric machine having a stator member provided with a substantially cylindrical bore from one end thereof to the other, a cylindrical rotor member substantially co-extensive in length with said stator member, said rotor member being located within said cylindrical bore in said stator member and having a diameter slightly less than that of said bore in said stator member thereby to establish a slight annular clearance gap therebetween, said rotor member being provided with longitudinally extending bores containing the rotor conductors, passageway means connecting said longitudinally extending bores in said rotor member with said clearance gap, and means including at least one passageway through the body of said stator member opening into said clearance gap for supplying a flow of pressurized gas into said clearance gap thereby to establish a gas bearing sustaining said rotor member for rotation within said stator member, said pressurized gas also flowing from said clearance gap into said longitudinally extending bores in said rotor member for cooling said rotor conductors.

9. A dynamo-electric machine as defined in claim 8 wherein said rotor conductors are hollow, and which further includes passageway means for also feeding a portion of said pressurized gas from said bores in said rotor into the hollow interior of said rotor conductors for augmenting the cooling thereof.

10. A dynamo-electric machine as defined in claim 8 wherein said rotor conductors are provided with peripherally spaced longitudinally extending ribs in contact with said rotor bores to establish channels between said ribs for the flow of the pressurized cooling gas.

References Cited

UNITED STATES PATENTS

| | | | |
|---|---|---|---|
| 2,884,282 | 4/1959 | Sixsmith | 308—9 |
| 3,070,406 | 12/1962 | McKenney | 308—9 |
| 3,110,527 | 11/1963 | Fox | 308—122 |
| 3,110,828 | 11/1963 | Sternlicht | 310—90 |
| 3,298,751 | 1/1967 | Elwell | 308—9 |
| 3,302,048 | 1/1967 | Gray | 310—90 |
| 3,347,168 | 10/1967 | Nixon | 310—90 |
| 3,004,180 | 10/1961 | Macks | 310—90 |

MILTON O. HIRSHFIELD, Primary Examiner

L. L. SMITH, Assistant Examiner

U.S. Cl. X.R.

308—9